United States Patent
Lamothe et al.

(10) Patent No.: US 6,755,339 B2
(45) Date of Patent: Jun. 29, 2004

(54) FLUXING APPARATUS FOR APPLYING POWDERED FLUX

(75) Inventors: Christian Lamothe, Floing (FR); Gary Allan Kemble, Lockport, NY (US); John Stanley Rosen, Jr., Williamsville, NY (US)

(73) Assignee: Delphi Technologies, Inc., Troy, MI (US)

( * ) Notice: Subject to any disclaimer, the term of this patent is extended or adjusted under 35 U.S.C. 154(b) by 30 days.

(21) Appl. No.: 10/266,561

(22) Filed: Oct. 8, 2002

(65) Prior Publication Data

US 2003/0234272 A1 Dec. 25, 2003

Related U.S. Application Data

(60) Provisional application No. 60/390,376, filed on Jun. 21, 2002.

(51) Int. Cl.[7] .......................... B23K 5/22; B23K 20/14; B23K 31/02
(52) U.S. Cl. .......................... 228/20.1; 228/41; 228/43; 228/119
(58) Field of Search .......................... 228/19, 20.1, 41, 228/43, 119, 207, 214, 223, 217, 183; 209/146, 149

(56) References Cited

U.S. PATENT DOCUMENTS

| | | | |
|---|---|---|---|
| 4,009,816 A | | 3/1977 | Feuchtbaum et al. ....... 228/207 |
| 4,221,957 A | * | 9/1980 | Barger et al. ............... 219/73.2 |
| 4,244,465 A | | 1/1981 | Hishikawa et al. ......... 198/691 |
| 4,342,897 A | * | 8/1982 | Murai et al. ................ 219/73.2 |
| 4,348,574 A | * | 9/1982 | Barger et al. ............. 219/73.21 |
| 4,561,380 A | | 12/1985 | Mulder et al. .............. 118/688 |
| 4,765,525 A | * | 8/1988 | Popp et al. ..................... 228/9 |
| 4,770,344 A | | 9/1988 | Kaiser ............................ 239/8 |
| 4,774,106 A | * | 9/1988 | Kozono ....................... 427/202 |
| 4,796,558 A | | 1/1989 | Chartrand et al. ............ 118/74 |
| 4,901,907 A | * | 2/1990 | Enokido et al. ............ 228/183 |
| 4,989,775 A | | 2/1991 | Shimajiri et al. ........... 228/218 |
| 5,021,149 A | * | 6/1991 | Geisseler ..................... 209/141 |
| 5,174,490 A | | 12/1992 | Koisuka et al. ............. 228/183 |
| 5,316,863 A | | 5/1994 | Johnson et al. ............. 428/548 |
| 5,328,084 A | * | 7/1994 | Halstead et al. .............. 228/18 |
| 5,549,239 A | | 8/1996 | Morley et al. .............. 228/207 |
| 5,611,476 A | * | 3/1997 | Soderlund et al. ............ 228/42 |
| 5,632,331 A | | 5/1997 | Shinmura .................... 165/153 |
| 5,731,518 A | | 3/1998 | Willemen ..................... 73/438 |
| 5,806,752 A | | 9/1998 | Van Evans et al. ......... 228/183 |
| 5,857,367 A | | 1/1999 | Akiyama ........................ 72/42 |
| 6,012,511 A | | 1/2000 | Shinmura et al. ........... 165/133 |
| 6,036,083 A | * | 3/2000 | Luo et al. .................... 228/223 |
| 6,068,877 A | | 5/2000 | Seitz et al. ..................... 427/8 |
| 6,071,348 A | | 6/2000 | Seitz et al. .................. 118/712 |
| 6,105,850 A | * | 8/2000 | Lauzon et al. .............. 228/207 |
| 6,120,848 A | | 9/2000 | Van Evans et al. ......... 427/359 |
| 6,203,628 B1 | | 3/2001 | Katoh et al. .................. 148/23 |
| 6,340,110 B1 | * | 1/2002 | Nakamura et al. ........ 228/179.1 |
| 6,409,074 B1 | | 6/2002 | Katoh et al. ................ 228/223 |

FOREIGN PATENT DOCUMENTS

| | | |
|---|---|---|
| EP | 0529851 A | 3/1993 |
| EP | 0636422 A | 2/1995 |
| EP | 1084756 A | 3/2001 |
| JP | 07047314 A | 2/1995 |

* cited by examiner

Primary Examiner—Tom Dunn
Assistant Examiner—Colleen P. Cooke (57) ABSTRACT

A fluxer applies powdered flux to an object. The fluxer includes an enclosure that defines a chamber where the object is fluxed. The enclosure includes an inlet for receiving the object into the chamber prior to application of the flux and an outlet for discharging the object from the chamber after the flux has been applied. A conveyor extends through the enclosure for traversing the object into and out of the chamber. The fluxer also includes a hopper for storing the flux and an applicator in fluid communication with the hopper for applying the flux to the object. A flux recovery system is in fluid communication with the chamber to introduce and maintain a negative pressure within the chamber. As a result, excess flux is retained within the enclosure. This excess flux can then be recovered and recycled to the hopper.

21 Claims, 6 Drawing Sheets

FLUXING APPARATUS FOR APPLYING POWDERED FLUX

RELATED APPLICATIONS

This patent application claims priority to and all advantages of U.S. provisional Patent Application No. 60/390,376 which was filed on Jun. 21, 2002.

TECHNICAL FIELD

The subject invention generally relates to a fluxing apparatus for applying powdered flux to an object, such as a heat exchanger for a vehicle.

BACKGROUND OF THE INVENTION

Fluxing apparatuses, or fluxers, are known in the art. A fluxer is utilized in combination with a core stacking machine, a thermal degreasing unit, and a brazing furnace to manufacture an object, such as a heat exchanger for a vehicle.

More specifically, as is known in the art, the fluxer is utilized to apply flux to a surface or surfaces of the heat exchanger. The flux, which is a caustic chemical that dissolves existing metal oxide and prevents the formation of metal oxide, melts just below the temperature at which a layer of braze material, that is previously clad to the surface of the heat exchanger, melts. As such, the flux eliminates metal oxides which are detrimental to the wetting and flow of melted braze material into joint interfaces between the discrete components that make up the heat exchanger.

Generally, there are two types of flux, a wet slurry flux and a powdered flux. Conventional fluxers apply the powdered flux to the heat exchanger in one of two manners. The heat exchanger is either processed through a fluidized bed of the powdered flux, or the powdered flux is spray applied onto the heat exchanger.

The conventional fluxers that spray apply the powdered flux onto the heat exchangers are deficient for a variety of reasons. For instance, these conventional fluxers are prone to repeated failure and extensive service. The powdered flux, which has a fine, yet abrasive, particle size, wears excessively on the working components of the conventional fluxers, such as the gun nozzles and delivery tubes for the powdered flux. Further, these conventional fluxers do not make efficient use of the powdered flux. First, the powdered flux that is overspray, i.e., not adequately applied to the heat exchanger, is frequently allowed to exit the conventional fluxer. As a result, the factory or work area surrounding the conventional fluxers becomes contaminated with the powdered flux, which may create a safety hazard. Also, because the overspray is not recovered and recycled to be re-applied to other heat exchangers, significant amounts of the powdered flux are wasted which increases operating costs. The conventional fluxers are also limited in that they are only equipped to flux certain types of heat exchangers depending on their size. That is, the conventional fluxers are not dynamic because they cannot detect and then accommodate heat exchangers of various sizes.

Due to the deficiencies of the conventional fluxers that apply powdered flux, including those described above, it is desirable to provide a fluxing apparatus that is more reliable with increased wear-resistance and that incorporates a flux recovery system to retain excess powdered flux within the fluxing apparatus. It would also be advantageous to provide a fluxing apparatus that is able to recover and then recycle the excess powdered flux to minimize operating costs, and to provide a fluxing apparatus that is dynamic such that heat exchangers of all shapes and sizes can be fluxed.

SUMMARY OF THE INVENTION

A fluxing apparatus is disclosed. The fluxing apparatus applies powdered flux to an object. The fluxing apparatus integrates several components including an enclosure, a conveyor, a supply hopper, at least one application device, and a flux recovery system.

The enclosure defines a fluxing chamber where the object is fluxed. The enclosure includes an inlet and an outlet. The inlet receives the object into the fluxing chamber prior to application of the powdered flux and the outlet discharges the object from the fluxing chamber after the powdered flux has been applied. The conveyor extends through the enclosure between the inlet and the outlet. The conveyor traverses the object into and out of the fluxing chamber.

The supply hopper stores the powdered flux, and the application device, which is in fluid communication with the supply hopper and which is positioned to face at least one side of the conveyor, applies the powdered flux to the object.

The flux recovery system is in fluid communication with the fluxing chamber. The flux recovery system introduces and maintains a negative pressure within the fluxing chamber. As such, excess powdered flux is retained within the enclosure. Furthermore, the excess powdered flux can be recovered and then recycled to the supply hopper.

Accordingly, the subject invention provides a fluxing apparatus that integrates the components described above to achieve synergistic benefits. The fluxing apparatus of the subject invention integrates components that have increased wear-resistance and, therefore, last longer in service. This fluxing apparatus also incorporates a flux recovery system that minimizes operating costs by retaining excess powdered flux within the apparatus and then recovering and recycling this flux. In other word, the fluxing apparatus of the subject invention utilizes less flux overall. Additionally, it is advantageous that the fluxing apparatus of the subject invention can detect varying shapes and sizes of heat exchangers and can then adjust to accommodate such different heat exchangers.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Referring to the Figures, wherein like numerals indicate like or corresponding parts throughout the several views, a fluxing apparatus, or fluxer, is generally disclosed at 10. The fluxing apparatus 10 applies powdered flux 11 to an object 12, such as a heat exchanger 12 for a vehicle. Although the fluxing apparatus 10 can be used to apply powdered flux 11 to any object 12, its most preferred application is in the manufacture of heat exchangers 12. Accordingly, for descriptive purposes only, the object 12 is hereinafter referred to as the heat exchanger 12. Furthermore, as disclosed in the Figures, the fluxing apparatus 10 is preferably utilized in a continuous method. In such a method, the fluxing apparatus 10 continuously applies powdered flux 11 to a plurality of heat exchangers 12 that continuously traverse, or pass-through, the fluxing apparatus 10. Although the fluxing apparatus 10 applies powdered flux 11 to a plurality of heat exchangers 12, the subject invention is primarily described below in terms of a single heat exchanger 12.

The fluxing apparatus 10 of the subject invention includes an enclosure 14, a conveyor 16, a supply hopper 18, at least one application device 20, and a flux recovery system 22. These components are described additionally below. As understood by those skilled in the art, the fluxing apparatus 10 is utilized in combination with a core stacking machine, a thermal degreasing unit, and a brazing furnace to manufacture the heat exchanger 12. The core. stacking machine, thermal degreasing unit, and brazing furnace are not pertinent to the subject invention. Accordingly, these components are not disclosed in the Figures.

The fluxing apparatus 10 includes the enclosure 14. The enclosure 14 includes an inlet 24 and an outlet 26 and defines a fluxing chamber 28. The inlet 24 of the enclosure 14 receives the heat exchanger 12 into the fluxing chamber 28 prior to application of the powdered flux 11, and the heat exchanger 12 is discharged from the outlet 26 of the enclosure 14 after the powdered flux 11 has been applied to the heat exchanger 12 by the application device 20 as described below.

The fluxing apparatus 10 also includes the conveyor 16 that extends through the enclosure 14 through the between the inlet 24 and the outlet 26. The conveyor 16 traverses the object 12 into and out of the fluxing chamber 28. The heat exchanger 12 is mounted onto the conveyor 16 at or near the inlet 24 of the enclosure 14. Once on the conveyor 16, the heat exchanger 12 moves into the enclosure 14, into the fluxing chamber 28 where it is fluxed, and out of the enclosure 14 where the heat exchanger 12 then moves into the brazing furnace. Preferably, the conveyor 16 is continuous such that the heat exchanger 12 moves through the enclosure 14 at a constant rate. However, although it is not preferred, the conveyor 16 may be intermittent such that the heat exchanger 12 is moved into the enclosure 14, stops in the fluxing chamber 28 to be fluxed, and then moves out of the enclosure 14 and into the brazing furnace.

The type of conveyor 16 that may be utilized includes, but is not limited to, a belt-type conveyor, a rod belt-type conveyor, or a roller-type conveyor. Although the conveyor 16 may be a single, continuous unit, it is preferred that the conveyor 16 includes a plurality of conveyor sections 16A, 16B. In this preferred embodiment, at least one of the conveyor sections 16A is spaced from an adjacent conveyor section 16B to define an application gap 30 between the adjacent conveyor sections 16A, 16B. An underside of the heat exchanger 12 is, therefore, at least partially exposed at some point within the fluxing chamber 28. The importance of this partial exposure of the underside is described below.

The fluxing apparatus 10 preferably includes an object recognition system 32 that is disposed adjacent the inlet 24 of the enclosure 14. The object recognition system 32 detects at least one dimension of the heat exchanger 12 before the powdered flux 11 is to be applied to the heat exchanger 12. Preferably, the object recognition system 32 detects the length, width, and depth of the heat exchanger 12. The object recognition system 32 more specifically includes at least one laser 34 that detects the dimension or dimensions of the heat exchanger 12 prior to application of the powdered flux 11. Although not required, it is preferred that the object recognition system 32 includes three lasers 34. The lasers 34 detect the length, width, and depth of the heat exchanger 12 or heat exchangers 12 that are traversing into the fluxing chamber 28. Other devices suitable for detecting dimensions of objects, that are not necessarily laser-dependent, may be used as the object recognition system 32 including, but not limited to LED light curtains, photoelectric sensors, and video camera based vision systems.

The fluxing apparatus 10 includes the supply hopper 18. The supply hopper 18 stores the powdered flux 11 for delivery to the application device 20. The supply hopper 18 receives the powdered flux 11 from a virgin drum 36 of the powdered flux 11 or from excess powdered flux 11 that is recovered and recycled as described below. Regardless of its source, once the powdered flux 11 is in the supply hopper 18, it is distributed to the application device 20 to be applied to the heat exchanger 12. The subject invention includes a feed mechanism 38, preferably a screw feeder 40, disposed between the supply hopper 18 and the application device 20 for appropriately distributing the powdered flux 11 from the supply hopper 18 to the application device 20. The feed mechanism 38, preferably the screw feeder 40, is disposed in a supply bin 42 above the application device 20 to distribute the powdered flux 11 from the supply hopper 18, through the supply bin 42, and to the application device 20. It is to be understood that, although the feed mechanism 38 is disclosed as the screw feeder 40, the feed mechanism 38 can be other equivalent devices that are suitable for distributing, i.e., moving, powdered materials, such as powdered flux 11.

As described above, the fluxing apparatus 10 includes the at least one application device 20, i.e., applicator. The at least one application device 20 is in fluid communication with the supply hopper 18 and is positioned to face at least one side of the conveyor 16 for applying the powdered flux 11 to the heat exchanger 12, which is on the conveyor 16. The application device 20 may be a rotary atomizer, such as a bell, or may be a spray gun.

Although only one application device 20 is required, the preferred embodiment of the subject invention includes a plurality of spray guns 44 for applying the powdered flux 11 to the heat exchanger 12. Accordingly, the subject invention is primarily described in terms of the plurality of spray guns 44. In the preferred embodiment, the application device 20 is an electrostatic spray application device, most preferably electrostatic spray guns 44. However, there is no requirement that the application device 20 be an electrostatic spray application device. Instead, for example, the application device 20 may be a non-electrostatic spray gun.

If the application device 20 is an electrostatic spray application device, then it is understood by persons skilled in the art that additional hardware including, but not limited to, anti-static brushes, rubber wipers, and air blast devices, may be utilized to optimize the electrical continuity between the heat exchanger 12 and the conveyor 16 such that the heat exchanger 12 is sufficiently grounded and a uniform coating of flux on the heat exchanger 12 can be achieved.

At least one reciprocation assembly 46 is disposed between the supply hopper 18 and the spray guns 44. In this position, the reciprocation assembly 46 supports the spray guns 44 such that the spray guns 44 can reciprocate, i.e., move alternately back and forth, if necessary, during application of the powdered flux 11 to the object 12.

Preferably, at least one spray gun 44A of the plurality 44 is positioned to face a top side of the conveyor 16. As such, this spray gun 44A applies the powdered flux 11 to a top side of the heat exchanger 12. It is also preferred that at least one spray gun 44B of the plurality 44 is positioned to face an underside of the conveyor 16 for applying the powdered flux 11 to the underside of the heat exchanger 12. More specifically, this particular spray gun 44B, i.e., the spray gun that faces the underside of the conveyor 16 applies the powdered flux 11 to the underside of the heat exchanger 12 through the application gap 30 defined between the adjacent conveyor sections 16A, 16B as described above.

Figure 2:
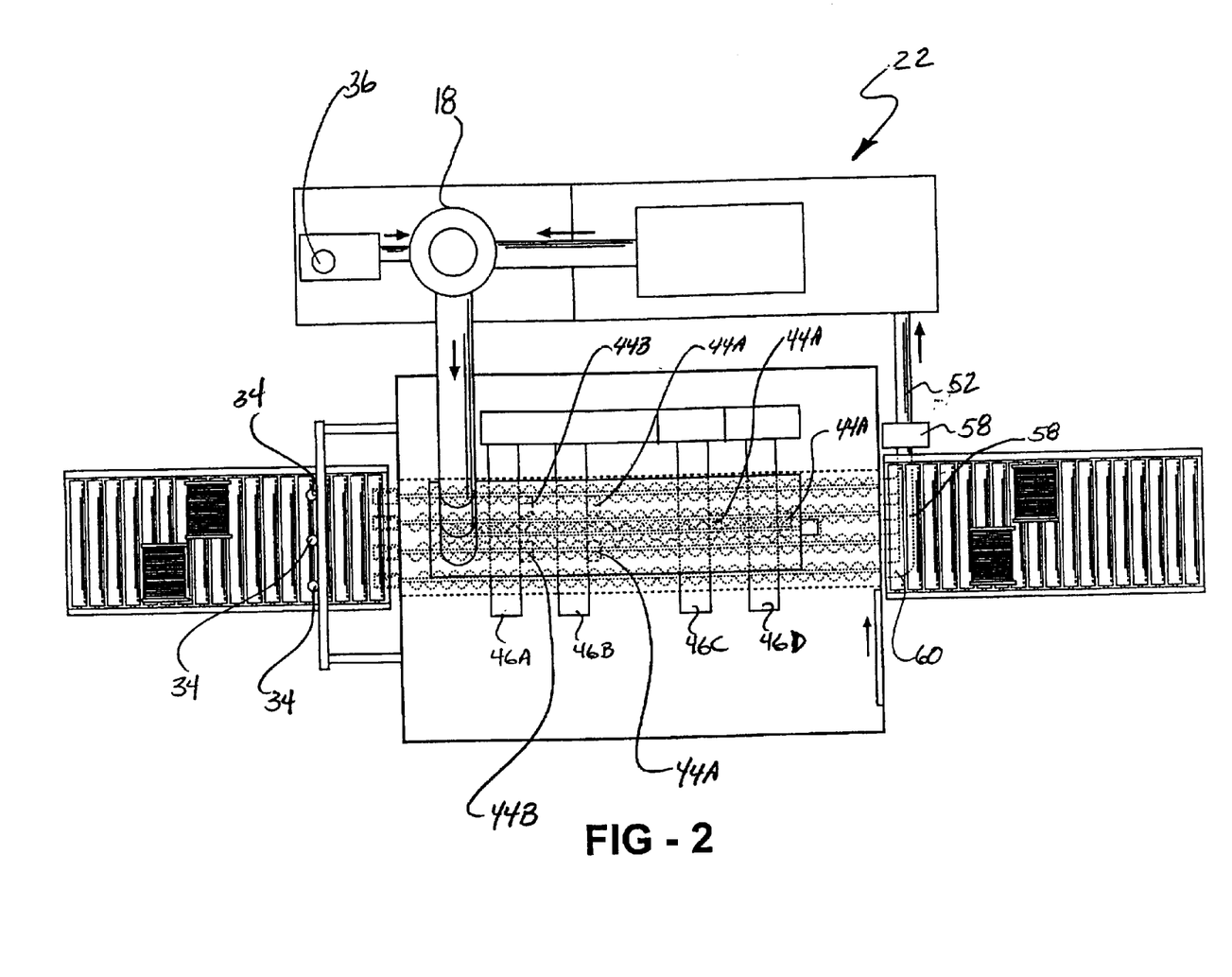
FIG. 2 is top view of the fluxing apparatus.
Figure 3:
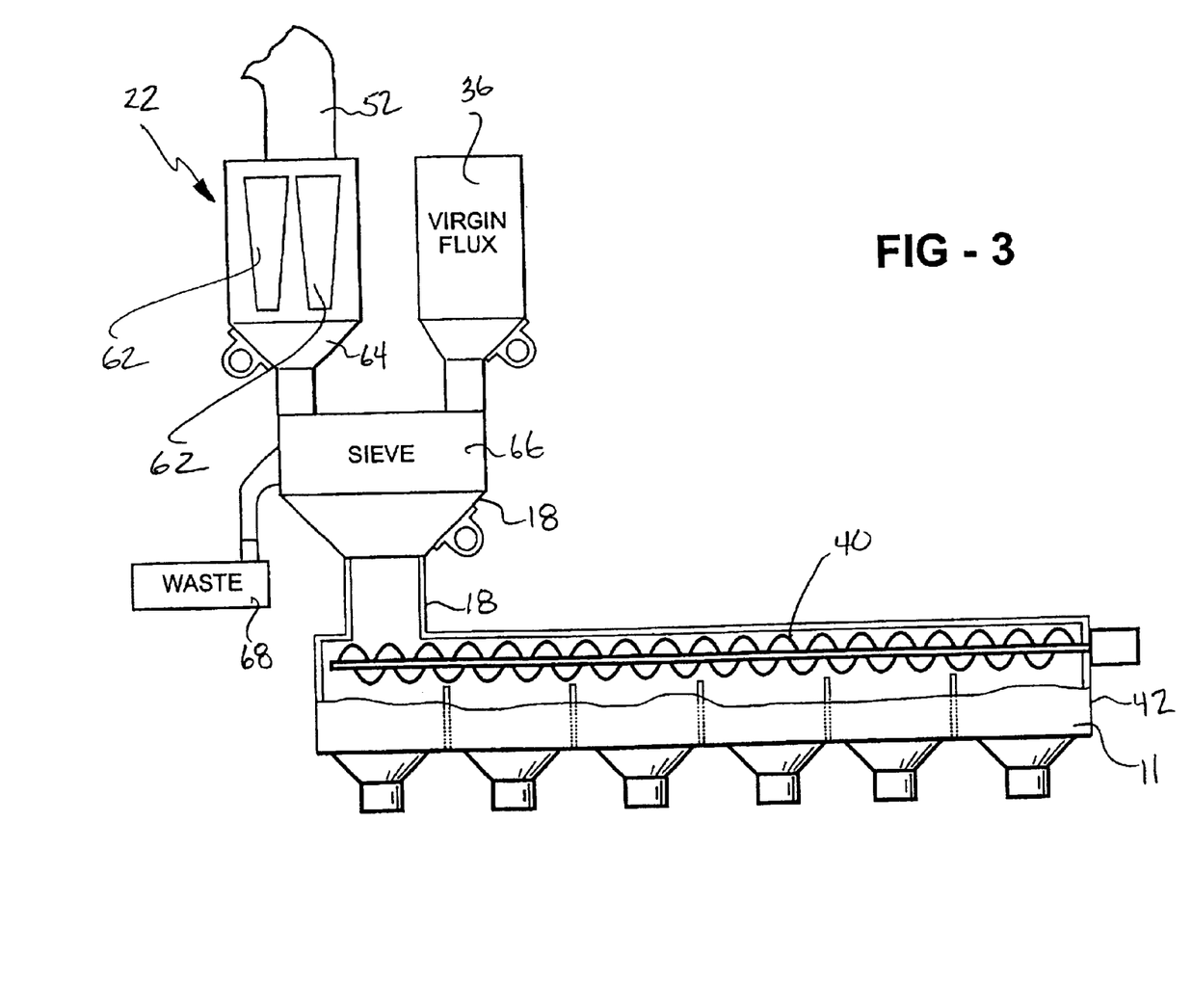
FIG. 3 is a detailed side view of the fluxing apparatus.

In the most preferred embodiment of the subject invention, the plurality of spray guns 44 is further defined as a first and second spray gun positioned to face the underside of the conveyor 16, and a third, fourth, fifth, and sixth spray gun positioned to face the top side of the conveyor 16. In this embodiment, there is a first reciprocation assembly 46A, a second reciprocation assembly 46B, a third reciprocation assembly 46C, and a fourth reciprocation assembly 46D. As disclosed best in the top view of FIG. 2, the first reciprocation assembly 46A supports the first and second spray guns, the second reciprocation assembly 46B supports the third and fourth spray guns, the third reciprocation assembly 46C supports the fifth spray gun, and the fourth reciprocation assembly 46D supports the sixth spray gun.

The feed mechanism 38, originally described above, is more specifically disposed between the supply hopper 18 and the spray guns 44 for appropriately distributing the powdered flux 11 to each of the spray guns 44. To get to the spray guns 44, the powdered flux 11 is distributed from the supply hopper 18, through the supply bin 42 via the feed mechanism 38, to the reciprocation assemblies 46, and then to the spray guns 44. A cone and venturi-type assembly 48 is disposed between the supply bin 42 and the reciprocation assemblies 46, which support each spray gun 44, to ensure that consistent and adequate amounts of the powdered flux 11 are supplied to each of the spray guns 44. Preferably, there is one cone and venturi-type assembly 48 associated with each spray gun 44.

The fluxing apparatus 10 further includes a controller 50. The controller 50, preferably a programmable logic controller (PLC), is operatively connected with the object recognition system 32 described above and also with at least one of the conveyor 16 and the application device 20. Preferably, the controller 50 is operatively connected with the object recognition system 32 and with both the conveyor 16 and the application device 20, i.e., the spray guns 44. It is to be understood that, if the controller 50 is operatively connected with the spray guns 44, then the controller 50 is operatively connected to the spray guns 44 through the reciprocation assemblies 46. That is, the controller 50 may also be operatively connected to the reciprocation assemblies 46. Due to such connections, the controller 50 is able to adjust an operating parameter of the fluxing apparatus 10 in response to the dimension, or dimensions, detected by the object recognition system 32. In operation, the object recognition system 32, preferably the lasers 34, reads the dimension or dimensions of the heat exchanger 12, and the controller 50 adjusts certain operating parameters including, but not limited to, conveyor speed, reciprocation speed, and reciprocation traverse length, i.e., the length of the stroke as the spray guns 44 traverse back and forth on a reciprocation assembly 46. Adjustment of these, and other, operating parameters permits the fluxing apparatus 10 of the subject invention to adjust for and to therefore accommodate different heat exchangers 12, i.e., heat exchangers 12 having varying shapes and sizes.

The fluxing apparatus 10 further incorporates a flow rate verification system for confirming that there is a flow of the powdered flux from the application device 20 to the heat exchanger 12. The flow rate verification system is incorporated into the controller 50 or some other controller operatively connected with the fluxing apparatus 10 and is utilized in embodiments where the application device 20 is an electrostatic spray application device. In such embodiments, an electric field is generated between the application device 20 and the heat exchanger 12. The flow rate verification system measures the current present in this electric field. In the absence of the powdered flux, the current of this electric field increases, and the flow rate verification system detects this increase and generates an alarm. More specifically, the flow rate verification system detects when the current exceeds a certain acceptable threshold and then generates the alarm. The fluxing apparatus 10 automatically shuts down, or is manually shut down, in response to this alarm.

The fluxing apparatus 10 further includes the flux recovery system 22. The flux recovery system 22 is in fluid communication with the fluxing chamber 28 to introduce and to maintain a negative pressure within the fluxing chamber 28. As a result, any excess powdered flux 11 is retained within the enclosure 14. Excess powdered flux 11 is commonly referred to as overspray and is any powdered flux 11 within the fluxing chamber 28 that does not get applied to the heat exchanger 12. Also as a result of the negative pressure, the excess powdered flux 11 can be recovered and recycled to supply hopper 18 as described below.

Figure 4:
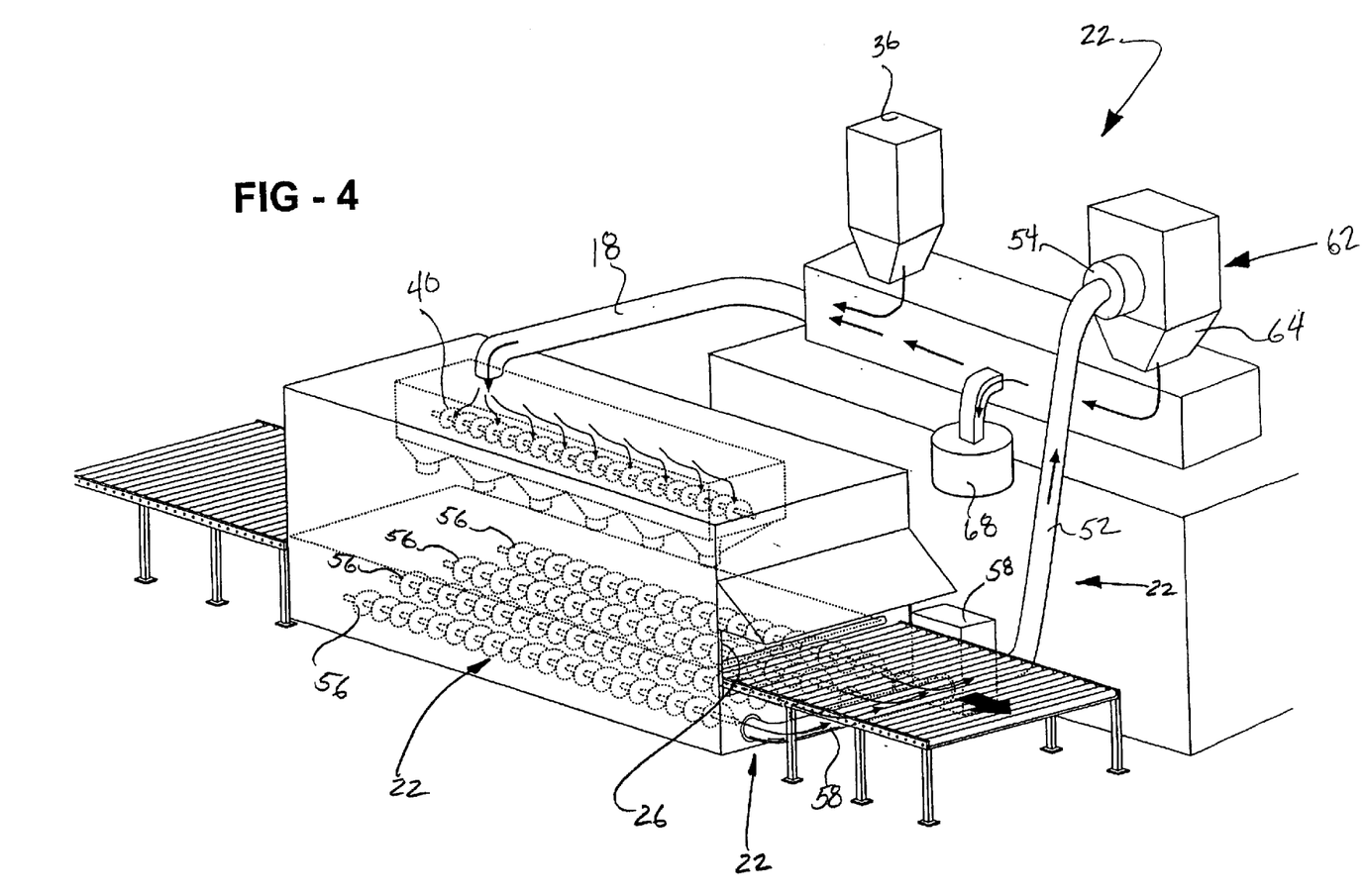
FIG. 4 is a perspective view of the fluxing apparatus.
Figure 5:
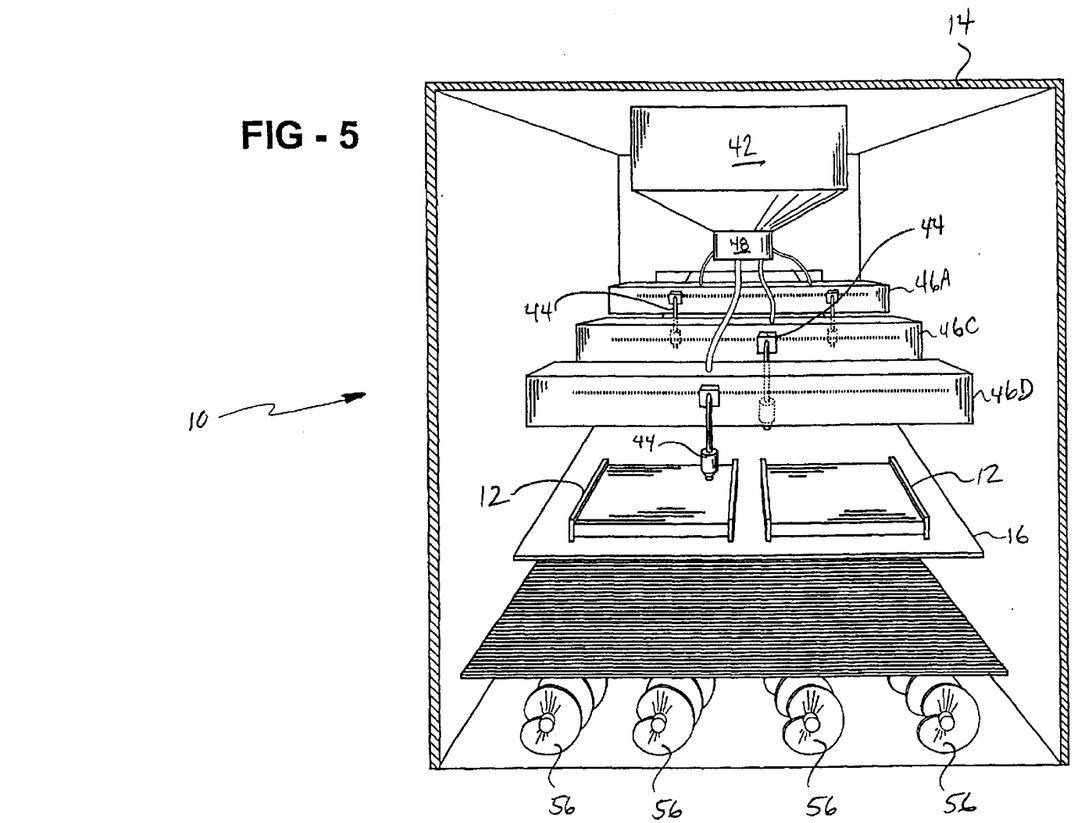
FIG. 5 is a perspective view of the fluxing apparatus taken along line 5—5 of FIG. 1A.

To retain the excess powdered flux 11 within the enclosure 14 and to recover and subsequently recycle the excess powdered flux 11, the flux recovery system 22 includes a duct 52 that is in fluid communication with the fluxing chamber 28. The negative pressure is introduced and maintained within the fluxing chamber 28. More specifically, an exhaust fan 54 is in fluid communication with the duct 52. The fan 54, which preferably operates on a continuous basis, introduces and maintains the negative pressure within the fluxing chamber 28 through the duct 52. The fan 54 is represented schematically in FIG. 4.

Figure 1A:
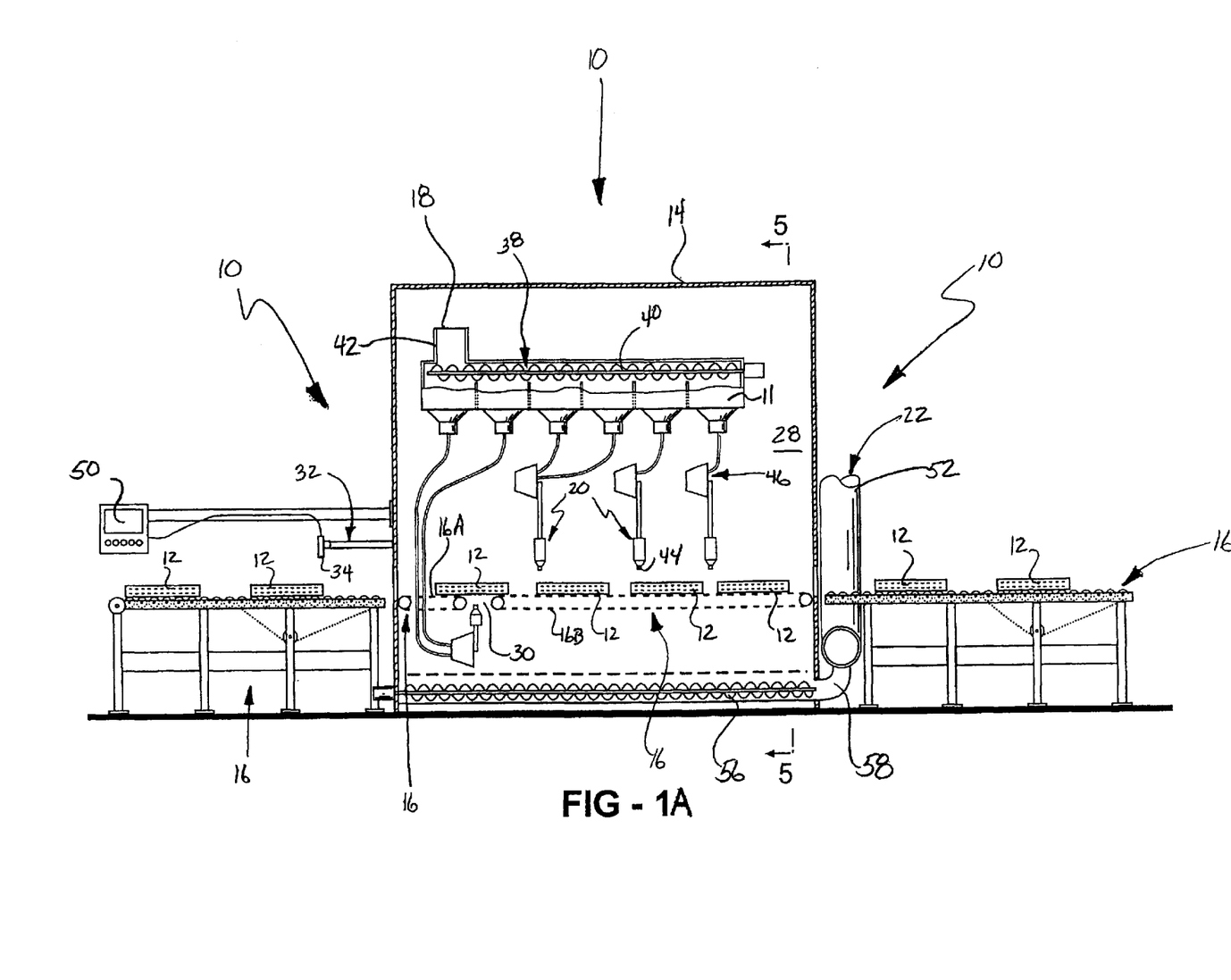
FIG. 1A is a partially cross-sectional side view of a fluxing apparatus of the subject invention.
Figure 1B:
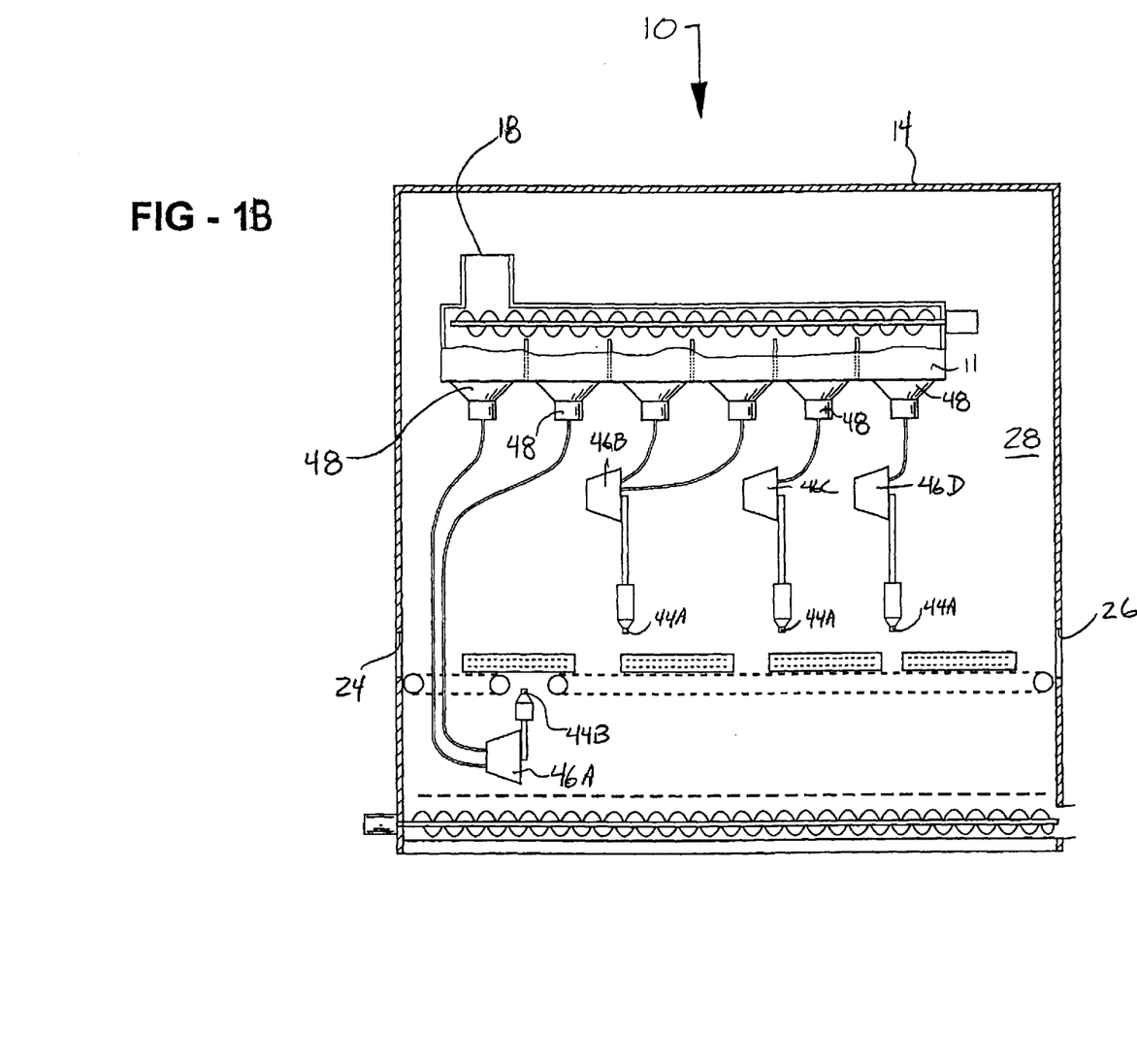
FIG. 1B is an enlarged partially cross-sectional side view of an enclosure of the fluxing apparatus.

In addition to the fluxing chamber 28, the duct 52 is also in fluid communication with the supply hopper 18. As such, the duct 52 recycles the excess powdered flux 11 that has been recovered from the fluxing chamber 28 into the supply hopper 18 as the negative pressure is maintained within the fluxing chamber 28. To recover the powdered flux 11 from the fluxing chamber 28, the flux recovery system 22 further includes at least one recovery feed screw 56. The recovery feed screw 56 is disposed within the flux chamber 28 adjacent a bottom of the flux chamber 28. The recovery feed screw 56 is in fluid communication with the duct 52 for directing the excess powdered flux 11 into the duct 52 where the excess powdered flux 11 can then be recycled into the supply hopper 18. Preferably, the flux recovery system 22 includes a plurality of recovery feed screws 56 to direct the excess powdered flux 11 into the duct 52. As disclosed in the Figures, the most preferred embodiment of the subject invention includes four recovery feed screws 56. In embodiments where there is more than one recovery feed screw 56, the flux recovery system 22 further includes a collection manifold 58. The collection manifold 58 is represented schematically in FIGS. 1A, 2, and 4. The collection manifold 58 is disposed between the recovery feed screws 56 and the duct 52 for collecting the excess powdered flux 11 that has been recovered from each of the recovery feed screws 56 prior to recycling into the supply hopper 18. The collection manifold 58 is in fluid communication with the duct 52 via a plurality of secondary ducts 60 that are associated with each recovery feed screw 56. Although a plurality of these secondary ducts 60 are disclosed in the Figures, only one secondary duct 60 (see FIG. 2) is numbered for clarification purposes in the Figures.

The purpose of the duct 52 is two-fold. First, air is drawn from the fluxing chamber 28 thereby establishing negative pressure within the chamber 28 to discourage the random floating of the powdered flux 11 out either the inlet 24 or outlet 26 of the enclosure 14. Second, the excess powdered flux 11 is carried with the air that is drawn from the fluxing chamber 28 through the duct 52. The flux recovery system 22 includes a filter 62 that is disposed between the duct 52 and the supply hopper 18 for filtering the excess powdered flux 11 before is it recycled into the supply hopper 18. More specifically, the excess powdered flux 11 collects on the filter 52 as a retentate. A vibrating mechanism 64 vibrates the filter 62 to recover this filter retentate. The recovered flux 11 is then introduced into a sieve 66, where it is combined with the powdered flux 11 from the virgin drum 36, then introduced into the supply hopper 18, and then introduced into the supply bin 42 via the feed mechanism 38. Waste flux is collected in a waste bin 68.

The fluxing apparatus 10 of the subject invention is applicable regardless of whether the heat exchanger 12 is first processed through a thermal degreasing unit or not. Accordingly, the fluxing apparatus 10 of the subject application may be utilized in the method described in U.S. Pat. No. 6,036,083 which is entitled "Method For Braze Flux Application," the disclosure of which is herein incorporated by reference in its entirety.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. A fluxing apparatus for applying powdered flux to an object, said apparatus comprising:

an enclosure defining a fluxing chamber and comprising an inlet for receiving the object into said fluxing chamber prior to application of the powdered flux and an outlet for discharging the object from said fluxing chamber after the powdered flux has been applied;

a conveyor extending through said enclosure between said inlet and said outlet for traversing the object into and out of said fluxing chamber;

a supply hopper for storing the powdered flux;

at least one application device in fluid communication with said supply hopper and positioned to face at least one side of said conveyor for applying the powdered flux to the object; and a flux recovery system in fluid communication with said fluxing chamber to introduce and maintain a negative pressure within said fluxing chamber for retaining excess powdered flux within said enclosure and for recovering and recycling the excess powdered flux to said supply hopper.

2. A fluxing apparatus as set forth in claim 1 further comprising an object recognition system disposed adjacent said inlet of said enclosure for detecting at least one dimension of the object prior to application of the powdered flux.

3. A fluxing apparatus as set forth in claim 2 wherein said object recognition system comprises at least one laser that detects the at least one dimension of the object prior to application of the powdered flux.

4. A fluxing apparatus as set forth in claim 2 further comprising a controller operatively connected with said object recognition system and with at least one of said conveyor and said at least one application device for adjusting an operating parameter in response to the dimension detected by said object recognition system.

5. A fluxing apparatus as set forth in claim 1 wherein said at least one application device is further defined as a plurality of spray guns for applying the powdered flux to the object.

6. A fluxing apparatus as set forth in claim 1 wherein said at least one application device is further defined as an electrostatic application device.

7. A fluxing apparatus as set forth in claim 5 further comprising a feed mechanism disposed between said supply hopper and said spray guns for appropriately distributing the powdered flux to each of said spray guns.

8. A fluxing apparatus as set forth in claim 7 wherein said feed mechanism is further defined as a screw feeder.

9. A fluxing apparatus as set forth in claim 5 further comprising at least one reciprocation assembly disposed between said supply hopper and said spray guns to support said spray guns such that said spray guns can reciprocate during application of the powdered flux to the object.

10. A fluxing apparatus as set forth in claim 5 wherein at least one spray gun of said plurality is positioned to face a top side of said conveyor for applying the powdered flux to a top side of the object.

11. A fluxing apparatus as set forth in claim 10 wherein at least one spray gun of said plurality is positioned to face an underside of said conveyor for applying the powdered flux to an underside of the object.

12. A fluxing apparatus as set forth in claim 11 wherein said conveyor comprises a plurality of conveyor sections with at least one of said conveyor sections spaced from an adjacent conveyor section to define an application gap between said adjacent conveyor sections such that the underside of the object is at least partially exposed to said spray gun that is positioned to face said underside of said conveyor.

13. A fluxing apparatus as set forth in claim 5 wherein said plurality of spray guns is further defined as a first and second spray gun positioned to face an underside of said conveyor, and a third, fourth, fifth, and sixth spray gun positioned to face a top side of said conveyor.

14. A fluxing apparatus as set forth in claim 13 further comprising a first reciprocation assembly supporting said first and second spray guns, a second reciprocation assembly supporting said third and fourth spray guns, a third reciprocation assembly supporting said fifth spray gun, and a fourth reciprocation assembly supporting said sixth spray gun.

15. A fluxing apparatus as set forth in claim 1 wherein said flux recovery system comprises a duct in fluid communication with said fluxing chamber for introducing and maintaining the negative pressure within said fluxing chamber.

16. A fluxing apparatus as set forth in claim 15 wherein said duct is also in fluid communication with said supply hopper for recycling the excess powdered flux that has been recovered from said fluxing chamber into said supply hopper as the negative pressure is maintained within said fluxing chamber.

17. A fluxing apparatus as set forth in claim 16 wherein said flux recovery system further comprises a filter disposed between said duct and said supply hopper for filtering the excess powdered flux before is it recycled into said supply hopper.

18. A fluxing apparatus as set forth in claim 16 wherein said flux recovery system further comprises at least one recovery feed screw disposed within said flux chamber and in fluid communication with said duct for directing the excess powdered flux into said duct.

19. A fluxing apparatus as set forth in claim 18 wherein said at least one recovery feed screw is further defined as a plurality of recovery feed screws.

20. A fluxing apparatus as set forth in claim 19 wherein said flux recovery system comprises a collection manifold disposed between said plurality of recovery feed screws and said duct for collecting the excess powdered flux that has been recovered from each of said recovery feed screws prior to recycling into said supply hopper.

21. A fluxing apparatus as set forth in claim 15 wherein said flux recovery system further comprises an exhaust fan in fluid communication with said duct for introducing and maintaining the negative pressure within said fluxing chamber through said duct.

* * * * *